Dec. 5, 1950 W. J. PARKS 2,532,779
MOUNTING STRUCTURE FOR BEARINGS
Filed Oct. 2, 1947 3 Sheets-Sheet 1
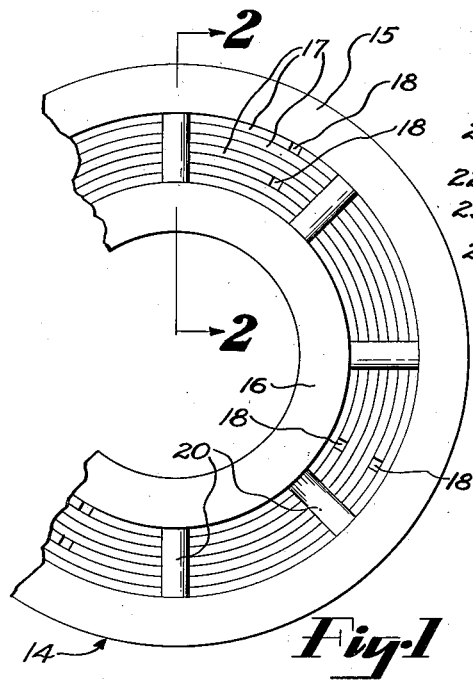
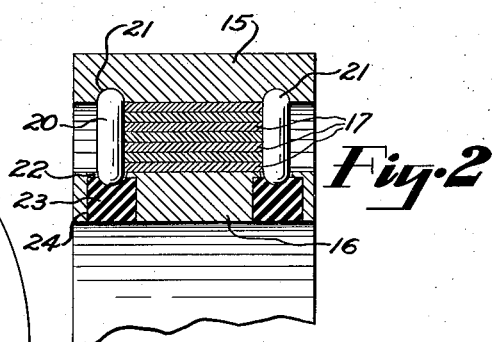
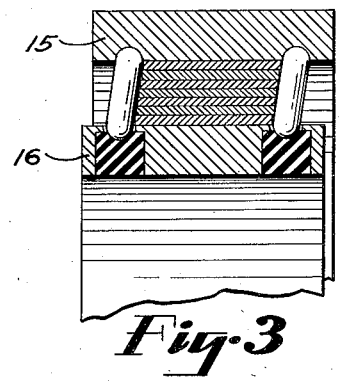
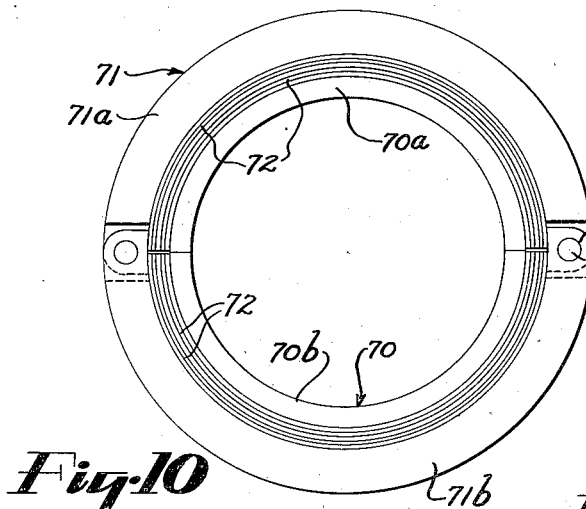
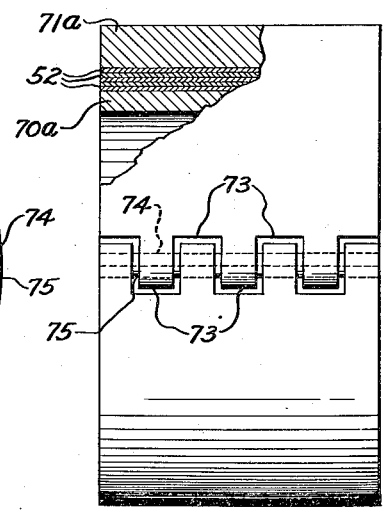
INVENTOR.
WALTER J. PARKS
BY Fay, Goldrick & Fay
ATTORNEYS

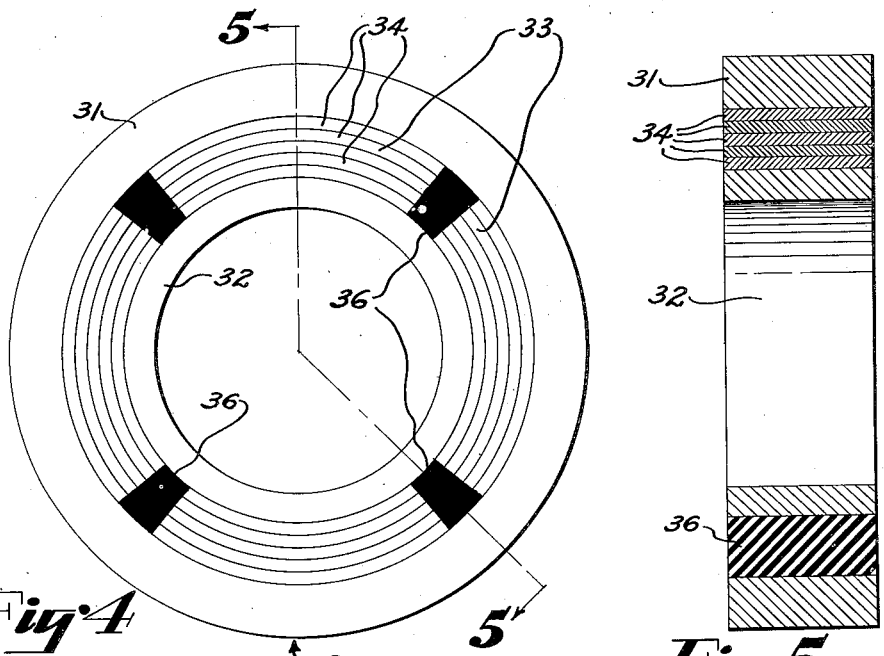
Fig. 4
Fig. 5
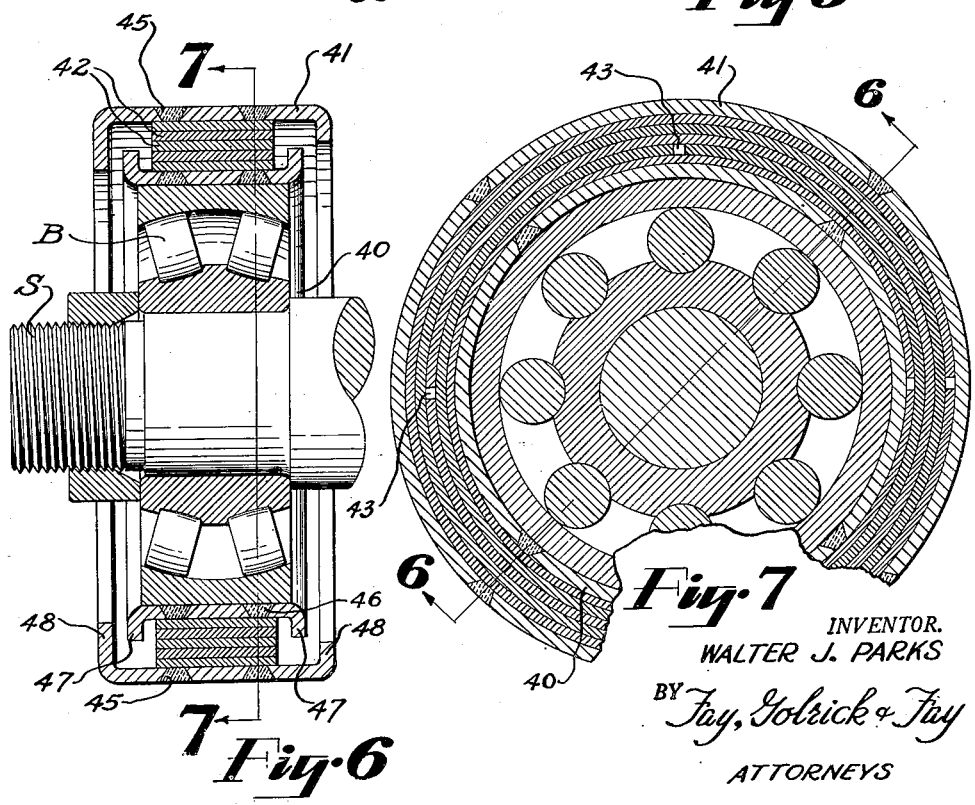
Fig. 6
Fig. 7
INVENTOR.
WALTER J. PARKS
BY Fay, Golrick & Fay
ATTORNEYS Dec. 5, 1950 W. J. PARKS 2,532,779
MOUNTING STRUCTURE FOR BEARINGS
Filed Oct. 2, 1947 3 Sheets-Sheet 3

INVENTOR.
WALTER J. PARKS
BY *Fay, Golrick & Fay*
ATTORNEYS

Patented Dec. 5, 1950

2,532,779

UNITED STATES PATENT OFFICE 2,532,779

MOUNTING STRUCTURE FOR BEARINGS

Walter J. Parks, Aurora, Ohio

Application October 2, 1947, Serial No. 777,420

13 Claims. (Cl. 308—15)

The present invention relates to structures for mounting a bearing in its housings or a bearing on its shaft so that the bearing may readily move axially relative to the housing or shaft to accommodate axial thrust loads which would otherwise be deleterious to the bearing but at the same time the mounting structure is substantially unyielding to radial loads on the bearing.

In many types of machines employing bearings, the bearing mountings are so arranged that the bearings which would normally be subjected to radial loads are at times, due to inaccuracies in the manufacture of the machine and possibly to thermal expansion of certain parts of the machine, subjected to abnormal and excessive axial thrust loads. When this occurs the bearings become overloaded, develop an excessive amount of heat, deteriorate rapidly and are irreparably damaged. In my co-pending application, Serial No. 759,071, filed July 5, 1947, now abandoned, I have disclosed a bearing mounting structure which may be interposed between a bearing and its housing or a bearing and its shaft and which will permit axial shifting of the bearing relative to its housing or shaft for relieving deleterious axial strains on the bearing. The essence of the structures shown consists of a coiled strip tightly wound about the bearing so that the convolutions of the coil form a support between the bearing and its housing which may be designed to have a slight amount of radial resiliency but is in general radially stiff but at the same time the convolutions may slide laterally or axially relative to one another when an axial thrust load is applied to the bearing.

An object of the present invention is to provide a bearing mounting structure which functions similarly to the mounting structures of my application but which may be fabricated without the continuous coiling operation therein disclosed and which under certain conditions, particularly where comparatively thick laminations are used compared to the bearing diameter, may be more readily fabricated.

A further object of the invention is to provide a bearing mounting structure of the character referred to which may consist of two or more complementary assembled sections for facilitating installation of the structure in certain types of machines.

Another object of the invention is to provide a bearing mounting of the character referred to in which a plurality of bands, nested in radial layers, are interposed between two cylindrical members concentrically positioned and means being provided for temporarily locking the two cylindrical members together for retaining the mounting structures in assembled relation until it is assembled with a bearing and bearing housing.

Other objects and advantages of the invention will be apparent from the following description of preferred forms of the invention, reference being made to the accompanying drawings, wherein:

Fig. 1 is a fragmentary view of one form of bearing mounting structure;

Fig. 2 is a view in section taken on line 2—2 of Fig. 1 showing parts of the structure in one position;

Fig. 3 is a view similar to Fig. 2, but showing parts of the structure in a different position;

Fig. 4 is a side view of a second form of bearing mounting structure;

Fig. 5 is a view in section taken on line 5—5 of Fig. 4;

Fig. 6 is a vertical view in section of a third form of bearing mounting structure with a bearing mounted therein, the view being taken on line 6—6 of Fig. 7;

Fig. 7 is a view of the bearing and bearing mounting structure shown in Fig. 6 taken on line 7—7;

Fig. 10 is a side view in elevation of split type of bearing mounting structure;

Fig. 11 is an end view of the mounting structure shown in Fig. 10, part thereof being broken away;

Figure 8:
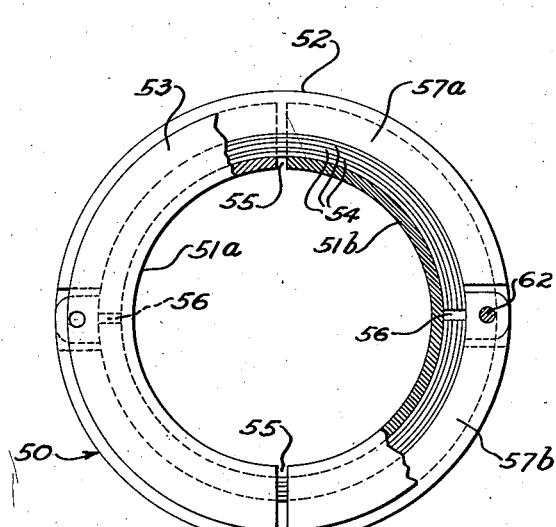
Fig. 8 is a side view of still another form of the invention, part thereof being broken away.

The present invention contemplates a plurality of laminations of cylindrical form, or in the form of sections of cylinders, nested in concentric relation and forming layers between the bearing and its housing, the laminations being slidable relative to one another in the direction of the axis of the bearing. The laminations may be assembled tightly between concentric inner and outer collars and maintained between the collars by various devices. In some forms of supports the laminations are semi-cylindrical so that two complementary sets of such laminations can be assembled about a bearing member.

Referring now to Figs. 1, 2 and 3, I have shown a bearing mounting structure 14 which comprises two cylindrical members 15 and 16 arranged concentrically with one another, and interposed between these members are a plurality of laminations each formed of metal bands or ribbons 17, which are substantially cylindrical in form. The bands are formed of relatively thin strips which are curved into a cylindrical form with the ends abutting except for a small space, as indicated at 18. The innermost band is placed over member 16 and its normal preformed diameter is such that this band contracts to hold the band to the inner member 16. The succeeding outer bands contract in the same manner onto the preceding inner band so that there is a clamping action between the adjacent bands, as they are assembled. Also, there will be some radial contractibility to the assembled body of bands so when the outer member 15 is pressed over the outer band 17 it will still further compress the assembly and more firmly nest each succeeding layer over the other and between the inner and outer collar. Preferably, the gap between the ends of the bands 17 are staggered relative to the gaps in adjacent bands so that the body of bands will approximate a continuous cylindrical member and will be uniformly resistant to radial loads. By forming the structure in this manner each successive band or layer of ribbon like material will nest with the adjacent layers thereof in a relatively tight relationship so that there will be a substantial and controlled resistance to radial loads, depending upon the number of laminations, the dimensions of the ribbon material, the type of material and the firmness of assembly, through the layers of the bands. This while producing a radially stiff structure permits the bands to slide axially relative to one another under an axial thrust load and it may be desirable to lubricate the bands to facilitate such movement.

In the coiled ribbon structure as disclosed in my co-pending application referred to hereinbefore, each coil is secured and held to the adjacent coils by the continuous structure of ribbon like material so that any tendency of the coils to wander or move excessively with respect to these adjacent coils is controlled.

In the structure herein disclosed there is not this continuity of structure so that unless some other means is provided under severe conditions of operation, and particularly under high frequency vibrating loads, one coil may work out from the adjacent coils to an undesired extent.

Figs. 1, 2 and 3 show additional members 20 and 21 which may be provided to prevent this wandering of the laminations. Members 20 and 21 of these figures are merely a typical construction provided for this purpose and other mechanical constructions may be used as may be best suited to individually designed bearing supporting structure to perform the same function.

In Figs. 2 and 3, the laminations are retained between the planes of the ends of the members 15 and 16 by a series of rods 20 on opposite side of the bands, which extend between the members 15 and 16. As may be seen in Figs. 2 and 3, the rods are rounded at their ends and the upper ends nest in sockets 21 formed in members 15, while the lower ends project through openings 22 and are seated in rubber blocks 23 secured within the openings 24 in the member 16. The rods are thus radially resiliently retained in position so that they may pivot to permit relative axial movement between members 15 and 16, as is illustrated in Fig. 3.

It will be noted that the ends of the rods 20 and 21 are held in the sockets of members 15 and 16 so that as one is displaced with reference to the other the ends of the rods will remain in the socket in definite spaced relation to the respective end planes of their contacting member but they will tilt axially with reference to a vertical centerline through the members so that each succeeding layers of laminated material will be displaced the same amount with reference to the adjacent layers and the total displacement of 15 with reference to 16 will be the sum of the displacement of all the layers with reference to each other. Due to this restraint no layer, under vibrational loads, can move more than the constraining elements permit and each must move a definite amount with respect to adjacent layers. This prevents wandering of any one layer with respect to the others. When the displacement is reversed these constraining elements 20 and 21 will return each lamination to its original position.

It will be seen that this bearing mounting structure may be completely assembled as a unit, which unit can then be interposed between a bearing and its supporting housing by mounting the member 15 in the bearing housing and press fitting the outer race of the bearing within the member 16, for example. The bearing mounting structure thus provides a relatively rigid support for radial loads on the bearings, but it will permit axial movement between the bearing and its housing by virtue of one lamination sliding on the other, thereby relieving unusual axial loads which would otherwise ruin the bearing within a short time.

A second form of the invention is shown in Figs. 4 and 5, wherein a bearing mounting structure 30 is shown. The structure 30 comprises two concentrically arranged cylindrical members 31 and 32 and interposed between these two members are laminated compression resistant elements 33, each of which consists of a plurality of bands 34 which are curved in the form of cylindrical segments and nested to form layers concentric with the two members 31 and 32. Each of the compressive resistant elements 33 are separated by rubber blocks 36, which blocks are preferably bonded with the members 31 and 32. The ends of the bands abut the blocks and are thereby retained in position although slight sidewise movement between the adjacent bands may take place. By bonding the rubber blocks to the inner and outer collars the bands are positively prevented from sliding lengthwise should a twisting reaction occur between the inner and outer collars. If desired, the ends of the bands may also be bonded to the rubber blocks. The members 32 may be press driven over the outer race of a bearing and member 31 mounted to the bearing housing.

A third form of the invention is shown in Figs. 6 and 7 wherein there are inner and outer concentric members consisting of collars 40 and 41, respectively, having laminations in the form of bands 42 interposed therebetween, which bands are substantially cylindrical, the end of each band being separated by short gaps, as indicated at 43. The outermost band 42 is attached to the collar 41 by welding, as indicated at 45, and the innermost band is spot-welded to collar 40, as indicated at 46. The bands 42 are nested in the same manner as described with reference to the mounting structure 14. Preferably the end portions of the collar 40 are turned outwardly to form flanges 47 and the outer ends of the collar 41 are turned downwardly to form flanges 48.

The flanges as so formed serve a double purpose. First of all they add strength and stiffness to each individual piece and to the structure as a whole. For example, in Fig. 6, each of the elements 40 and 41 are so designed that they may be made of comparatively thin metal in the form of sheet or tubing formed to the given shape by spinning or drawing in dies. This would be the most economical method of forming these parts. Without the flanges these pieces would not be sufficiently rigid to hold the enclosed laminations tightly together as this construction requires and they would also be difficult, if not impossible to hold in a true cylindrical shape as required for this bearing mounting structure. This is particularly true as in most cases after the laminations have been secured within the inner and outer shells the inside diameter and outside diameter respectively of the same will be turned or ground to furnish dimensionally accurate and concentric surfaces for the finished part. The flanges can be so designed as to furnish this necessary stiffness to retain the shape of the part as so finished.

Secondly, these inwardly and outwardly projecting flanges will in an extreme case of wandering of any one or more of the laminations under vibrational load serve as a limit to such movement when the radial retainers as shown in Figs. 1, 2 and 3 are not used.

As is illustrated in the drawings, the collar 40 may be press fitted onto the outer race of a roller bearing B for mounting the bearing in a housing, not shown. The collar 41 is adapted to be mounted tightly in the housing and in the event of an end thrust on the shaft S, to which the inner race of the bearing is press fitted, the laminations 42 will slide relative to one another and relieve the end thrust load from the bearing.

Figure 9:
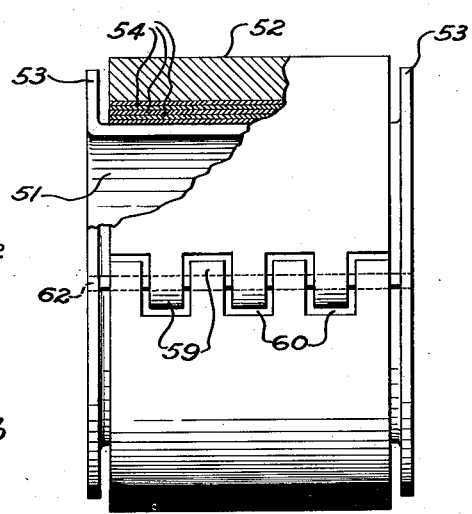
Fig. 9 is an end view of the structure shown in Fig. 8, part of the structure being broken away.

Still another form of bearing mounting structure is shown at 50 in Figs. 8 and 9. In this embodiment the inner circular bearing element is comprised of two semi-cylindrical segments 51a and 51b. These segments are preferably formed of sheet metal having radially extending flanges 53 about opposite ends thereof. A plurality of semi-cylindrical, concentrically-nested bands 54 substantially surround the two segments 51a and 51b, bridging the gaps 55 between the segments. The two bodies of bands are separated by gaps 56, and the latter gaps preferably fall at 90° with respect to the gap 55. The outer element of the mounting structure is formed by two complementary semi-cylindrical members 57a and 57b. These members have saw-toothed formations at the ends thereof forming projections 59 and recesses 60, which are arranged so that the projections 59 of one member extend loosely into the recesses of the other member, as may be seen in Fig. 9. The projections 59 are drilled laterally and a pin 62 is temporarily extended through the openings to hold the members 57 and 58 in place until the structure is mounted in the bearing housing. At that time the pin may be removed so that the two members may move toward or away from one another to accommodate the mounting structure in the bearing housing. This is important when the main bearing housing is split and is drawn together by bolts or similar means to clamp the bearing member outside diameter tightly and to facilitate the assembly of the machine. The structure as above described is therefore separable for mounting around a shaft but can be assembled complete thereafter for mounting in a bearing housing.

In some instances it may be desirable to provide a split mounting structure, that is, a mounting structure comprising two semi-cylindrical sections rather than a unitary annular mounting structure. Such split structures are particularly suitable for mounting split sleeve bearings and in many instances it is more convenient to mount anti-friction bearings by assembling the mounting structure radially about the bearing. One form of such split mounting structure is shown in Figs. 10 and 11, in which there is provided an inner split or semi-cylindrical collar 70 and an outer concentric split collar 71. The split collars consist of two complementary members 70a and 70b, and 71a and 71b, respectively, and each are in the form of semi-cylinders. These inner collars may consist of split sleeve type bearing elements adapted to be mounted on a shaft, not shown. Semi-cylindrical bands 72 are interposed between the outer and inner collars in nested, concentric relation with the ends of the band approximately coincident with the plane of the ends of the inner collar members but having some clearance between adjacent halves to allow additional radial compression of the laminated structure, as shown in Fig. 10.

To maintain the elements of the structure in assembled relation prior to installation in a machine a temporary locking means is provided for securing the parts together. To this end, the collar members 71a and 71b are saw-toothed similarly to the members 52 of the bearing mounting 50, as may be seen in Fig. 11, which provide spaced lugs 75 which project loosely between the corresponding lugs of the adjacent collar. The projecting portions have transverse openings drilled therethrough as shown at 74, and a pin 75 is extended through the openings for holding the collar members together. The diameter of the collar 71 is such that, when held together by pin 75, the collar members 70a and 70b and the bands 72 are compressed and held firmly in their respective positions. When assembling the mounting structure in a machine, the lower half may be first placed in the bearing housing and then the bearing nested on collar member 70b, after which the upper half of the mounting is placed over the top portion of the bearing and the outer bearing housing placed and secured in final position. The bearing may be the conventional sleeve type, or it may be a roller or ball bearing. The pin 75 acts as a retaining element for the separate pieces after fabrication to prevent separation of the pieces before final assembly in the bearing housings.

Figure 12:
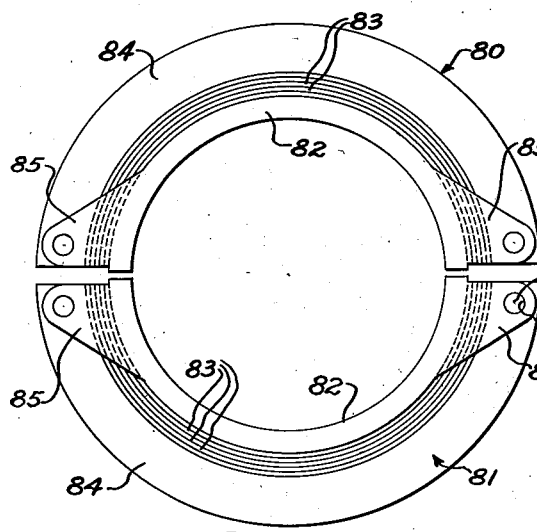
Fig. 12 is a side view of a bearing mounting structure for split bearings.
Figure 13:
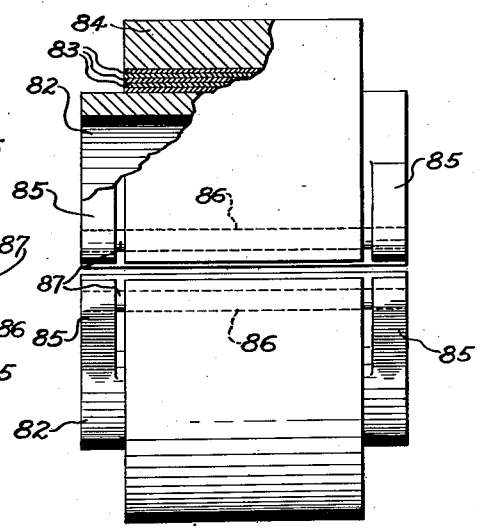
Fig. 13 is an end view of the structure shown in Fig. 12, but with part of the structure being shown removed.

Another form of bearing mounting is shown in Figs. 12 and 13. This member comprises two complementary structures, 80 and 81, each formed of an inner semi-cylindrical member 82, upon which are nested a plurality of semi-cylindrically formed bands 83 and an outer semi-cylindrical member 84 is nested over the bands 83. The inner members 82 are provided with radially projecting lugs 85 at the opposite ends and on each side thereof, which lugs project along the side and end portions of the members 84. The lugs and end portions of the outer member 84 are drilled transversely as at 86 and a pin 87 is adapted to be extended through the openings in the lugs and members 84 for locking the latter members 81. This arrangement maintains the bands in assembled position between the semi-cylindrical members until the structure is placed in a bearing housing when the pin 87 may be removed. The assembly in a machine of the present mounting structure is similar to that described with reference to the structure shown in Figs. 10 and 11.

The foregoing description has been directed principally to that application of the invention wherein the laminated structure is located between the bearing means and the outer surrounding housing as this is in general the most suitable arrangement.

It is obvious, however, that when the occasion so demands the same type of laminated structure could be interposed between the shaft on which the bearing is mounted and the bearing means itself.

More particularly referring for illustration to Fig. 1 and for purposes of description assuming the structure is to be used in combination with an anti-friction bearing of the ball or spherical roller type. Then, the collar 16 would be pressed tightly onto the journal portion of the shaft and the outer collar would be pressed firmly into the bore of the inner race of the bearing. The outer race of the bearing would be mounted with a snug or press fit in the housing. Then if axial displacement of one race with respect to the other was required to align the outer and inner races axially this would be accomplished by a displacement of the radially disposed laminated structure in exactly the same manner as would occur if the laminated structure of Fig. 1 was mounted firmly around the outside race of the bearing, the inner race being pressed on the shaft and pressed tightly into an outwardly disposed housing member.

Also, in the foregoing description the action of the bearing in accommodating lateral thrust loads by a similarly directed lateral displacement has been discussed by the action of a single bearing. This has been done for ease of reference and to avoid needless repetition of the description of one or more complementary bearings associated in a shaft assembly any of which as required may or may not have this special mounting.

For example, a typical shaft assembly could be considered to be a shaft mounted for rotation with the inner races of two anti-friction bearings capable of carrying radial and thrust loads being pressed firmly on the shaft while the outer races were mounted at opposite ends of a tubular housing connecting the bearings in suitable housing members. In such a conventional arrangement it is necessary on using this type of anti-friction bearing to mount one outer race tightly in the housing so that it cannot move laterally to take any thrust loads incident to normal operation of the machine and to mount the other with a sliding fit on the housing so that this race can move axially to compensate for temperature changes and inaccuracies of manufacturing. Otherwise experience has shown that this assembly will lock up and ruin the bearings. In this type of mounting wherein one race must move axially, under some load conditions the loose fit will allow the race to spin, thus ruining the housing and bearing. It is to allow this axial expansion and at the same time restrain the race from spinning that the structure of the invention has been devised. Furthermore, while it would only be necessary to use this structure around one of two bearings in such an arranged pair to accommodate the necessary lateral deflection because under some conditions this structure will be provided with some radial flexibility it would be best to mount each of the two bearings in the same type of laminated structure housing to obtain equal deflection under load and to provide a suitable restraining means so that the bearing which is designed to take normal thrust loads of the machine is held from axial displacement while the second of the two bearings is permitted by the lack of such restraint to deflect axially of the shaft.

The bearing mounting structure, hereinbefore, described although differing in some characteristics from the spirally coiled laminated structure of my aforementioned co-pending application, also permits a wide variation in design of the laminated elements to provide any desired amount of radial flexibility, ranging from extremely stiff to comparatively yielding, with any desired amount of lateral flexibility to accommodate any necessary lateral shifting of the bearing means.

These characteristics as mentioned in the co-pending application may be controlled by the number of laminations, the thickness and width of the laminated material, the kind of material selected together with its physical properties such as surface hardness, surface smoothness and relative elasticity and provision for suitably lubricating, by liquid or other means, the surfaces which are to slide one over the other.

For example, in selecting the material for a given service it may be desired that a minimum of frictional resistance exists between the sliding surfaces and at the same time the material have a high load carrying, fatigue and corrosion resistant ability.

An excellent material for this service would be a cold rolled spring steel material having a highly polished blued finish similar to that used on razor blades.

This steel when very slightly lubricated or with no lubrication slides freely on itself and will accommodate the necessary axial shifting very readily no matter how tightly, within reasonable limits, it is pressed together.

It is obvious that when a number of laminations are pressed firmly together within any reasonable limit of pressure, a very thin oil or air film will separate the adjacent laminations and it is this very thin film between laminations which gives to the structure the slight amount of radial flexibility which can be measured in thousandths of an inch and which also facilitates the sliding of adjacent laminations over each other.

Therefore, by varying the number of laminations of material, and by controlling the pressure of assembling them together a structure with a large number of laminations may be made with a greater radial yield or flexibility than one having a comparatively few laminations. This latter construction of a few layers of material and possibly comparatively thick material would be radially very stiff, having little or no radial compressibility. In general the heavier the load to be carried by the bearing the more radially rigid the mounting means must be.

In one way the physical structure of the cylindrical type laminae differs from the spirally wound type. The former laminae engage against the outer and inner cylindrical collars, respectively, throughout the entire circumferential area of the bands that are adjacent to the collars so that when the I. D. and O. D. of these collars are turned concentric they will remain concentric to each other after assembly. The laminated elements disclosed in my aforementioned application are formed by coiling a band and the outer and inner surfaces of said band are not truly concentric or cylindrical, so that in order to provide for uniform bearing contact between the coiled laminations and the inner and outer collars, it is necessary to especially form the collars to a spiral shape adjacent to the coils to correspond to the configuration of the coil surfaces or insert a shim circumferentially that has been tapered the same amount as the thickness of the lamination.

The laminated structure of the present invention also lends itself to the formation of split bearing mounting structures which can be more easily adapted to certain types of bearings, thereby widening the field of use of the laminated type of bearing mounting structures.

In normal use of the mounting, there will be no torque between the inner and outer collars of the mounting structures and the laminations will have no tendency to rotate about the axis of the bearing. In some instances, however, there will be a torsional stress transmitted to one of the collars from the bearing which will tend to cause one or more of the laminations to rotate about the bearing axis relative to the other laminations. The compression on the laminations will create, in most instances, sufficient friction to prevent such rotation. However, it may be desirable to provide holding means for preventing such rotation and one form of holding means has been shown in Figs. 4 and 5. Other forms of holding means could be employed provided they did not materially affect the ability of the laminations to slide axially and which would not interfere with the radial compressibility of the laminations.

Although I have described but one form of the invention, it will be understood that other forms might be adopted, all falling within the scope of the claims which follow.

I claim:

1. A bearing structure for mounting a bearing in a housing comprising an outer cylindrical member, an inner cylindrical member and a multiplicity of individual laminae consisting of thin plate-like elements between the inner and outer cylindrical members in compressed relationship having substantial surface to surface contact between the laminae, said laminae being slideable axially relative to one another to permit some axial movement while at the same time maintaining the structure substantially rigid radially.

2. A bearing structure for mounting a bearing in a housing comprising an outer cylindrical member, an inner cylindrical member and a multiplicity of cylindrical individual laminae consisting of thin arcuate plate-like elements between the inner and outer cylindrical members in compressed relationship having substantial surface to surface contact between the laminae, said laminae being slideable axially relative to one another to permit some axial movement while at the same time maintaining the structure substantially rigid radially.

3. A bearing structure for mounting a bearing in a housing comprising an outer cylindrical member, an inner cylindrical member and a multiplicity of cylindrical individual laminae consisting of thin semi-cylindrical plate-like elements between the inner and outer cylindrical members in compressed relationship having substantial surface to surface contact between the laminae, said laminae being slideable axially relative to one another to permit some axial movement while at the same time maintaining the structure substantially rigid radially.

4. A bearing structure for mounting a bearing in a housing comprising an outer cylindrical member, an inner cylindrical member and a multiplicity of cylindrical individual laminae consisting of thin metallic, arcuate plate-like elements between the inner and outer cylindrical members in compressed relationship having substantial metal to metal contact between the laminae, said laminae being slideable axially relative to one another to permit some axial movement while at the same time maintaining the structure substantially rigid radially.

5. A bearing structure for mounting a bearing in a housing comprising an outer cylindrical member, an inner cylindrical member and a multiplicity of cylindrical individual laminae consisting of thin metallic, semi-cylindrical plate-like elements between the inner and outer cylindrical members in compressed relationship having substantial metal to metal contact between the laminae, said laminae being slideable axially relative to one another to permit some axial movement while at the same time maintaining the structure substantially rigid radially, the outer laminae being secured to the outer cylindrical member and the inner laminae to the inner cylindrical member to avoid the danger of axial separation.

6. A bearing structure for mounting a bearing in a housing comprising an outer cylindrical member, an inner cylindrical member and a multiplicity of cylindrical individual laminae interposed between the two in the form of thin, arcuate, plate-like elements in compressed relationship having substantially surface to surface contact between the laminae and means for limiting axial sliding movement of the laminae relative to one another, said laminae being slideable axially relative to one another within certain limits while at the same time maintaining the structure substantially rigid radially.

7. A bearing structure for mounting a bearing in a housing comprising an outer cylindrical member, an inner cylindrical member and a multiplicity of cylindrical individual laminae consisting of thin, arcuate, plate-like elements between the inner and outer cylindrical member in compressed relationship, having substantially surface to surface contact between the laminae, one of said cylindrical members having a radially extending flange adapted to limit edgewise movement of said bands in which said laminae are slideable axially relative to one another but limited to permit some axial movement while at the same time maintaining the structure substantially rigid radially.

8. A bearing structure for mounting a bearing in a housing comprising an outer cylindrical member, an inner cylindrical member and a multiplicity of cylindrical individual laminae consisting of thin, arcuate, plate-like elements between the inner and outer cylindrical member in compressed relationship having substantially surface to surface contact between the laminae, the outer cylindrical member having an inwardly projecting flange, the inner of said members having an outwardly projecting radial flange to limit the edgewise movement of said laminae but allow some axial movement while at the same time maintaining the structure substantially rigid radially.

9. A bearing structure for mounting a bearing in a housing comprising an outer cylindrical member, an inner cylindrical member and a multiplicity of cylindrical individual laminae consisting of thin, arcuate, plate-like elements between the inner and outer cylindrical members in compressed relationship having substantially surface to surface contact between the laminae, a plurality of radial members at fixed intervals between the inner and outer cylindrical members and on both sides of the laminae to prevent the axial movement of the arcuate plate-like elements except in a uniform manner, said radial members being rigidly mounted between the inner and outer cylindrical members and being capable of pivotal movement in relation to the other cylindrical member, in which said laminae are slideable axially relative to one another but limited to permit some axial movement while at the same time maintaining the structure substantially rigid radially.

10. A bearing structure for mounting a bearing in a housing comprising an outer cylindrical member, an inner cylindrical member and a multiplicity of individual laminae consisting of thin, arcuate, plate-like elements between the inner and outer cylindrical members, these plate-like elements formed into a plurality of curved segments with resilient blocks interposed between the ends of said adjacent elements for resiliently maintaining the ends separated from one another.

11. A bearing mounting of the character defined in claim 10 in which the resilient blocks are bonded to the inner and outer cylindrical members.

12. A bearing mounting of the character defined in claim 10 in which the ends of the plate-like elements are bonded to the resilient blocks.

13. A bearing mounting of the character defined in claim 10 in which the ends of the plate-like element are bonded to the resilient blocks and the resilient blocks are bonded to the inner and outer cylindrical member.

WALTER J. PARKS.

REFERENCES CITED

The following references are of record in the file of this patent:

UNITED STATES PATENTS

| Number | Name | Date |
|---|---|---|
| 1,370,599 | Leon | Mar. 8, 1921 |
| 2,327,035 | Gray | Aug. 17, 1943 |

FOREIGN PATENTS

| Number | Country | Date |
|---|---|---|
| 786,485 | France | Sept. 3, 1935 |